United States Patent [19]

Miyao

[11] Patent Number: 4,631,718
[45] Date of Patent: Dec. 23, 1986

[54] METHOD AND DEVICE FOR SYNCHRONIZATION OF SYSTEM TIMING

[75] Inventor: Fumio Miyao, Ebina, Japan

[73] Assignee: Fuji Xerox Co., Ltd., Tokyo, Japan

[21] Appl. No.: 689,381

[22] Filed: Jan. 7, 1985

[30] Foreign Application Priority Data

Jan. 20, 1984 [JP] Japan .................................... 59-7344

[51] Int. Cl.⁴ .............................................. H04B 9/00
[52] U.S. Cl. .......................................... 370/4; 370/85; 370/94
[58] Field of Search ......................... 370/4, 60, 85, 94

[56] References Cited

U.S. PATENT DOCUMENTS 4,510,600 4/1985 Tan ....................................... 370/94

Primary Examiner—Joseph A. Orsino, Jr.
Attorney, Agent, or Firm—Kinney & Lange

[57] ABSTRACT

In a multistation communication network for effecting time-sharing multiplex transmission and reception of digital signals in the form of packets by the use of optical cables, this invention establishes system timing by putting up a flag identifying a master station only in the packet signal issued by a personal station which has acquired priority in system timing, finding front guard time for the individual personal stations by arithmetic processing using the distances from an optical star coupler to the personal stations and the guard time at the position of the optical star coupler, and clocking the front guard time based on the timing of reception of the packet signal from the master station.

7 Claims, 10 Drawing Figures

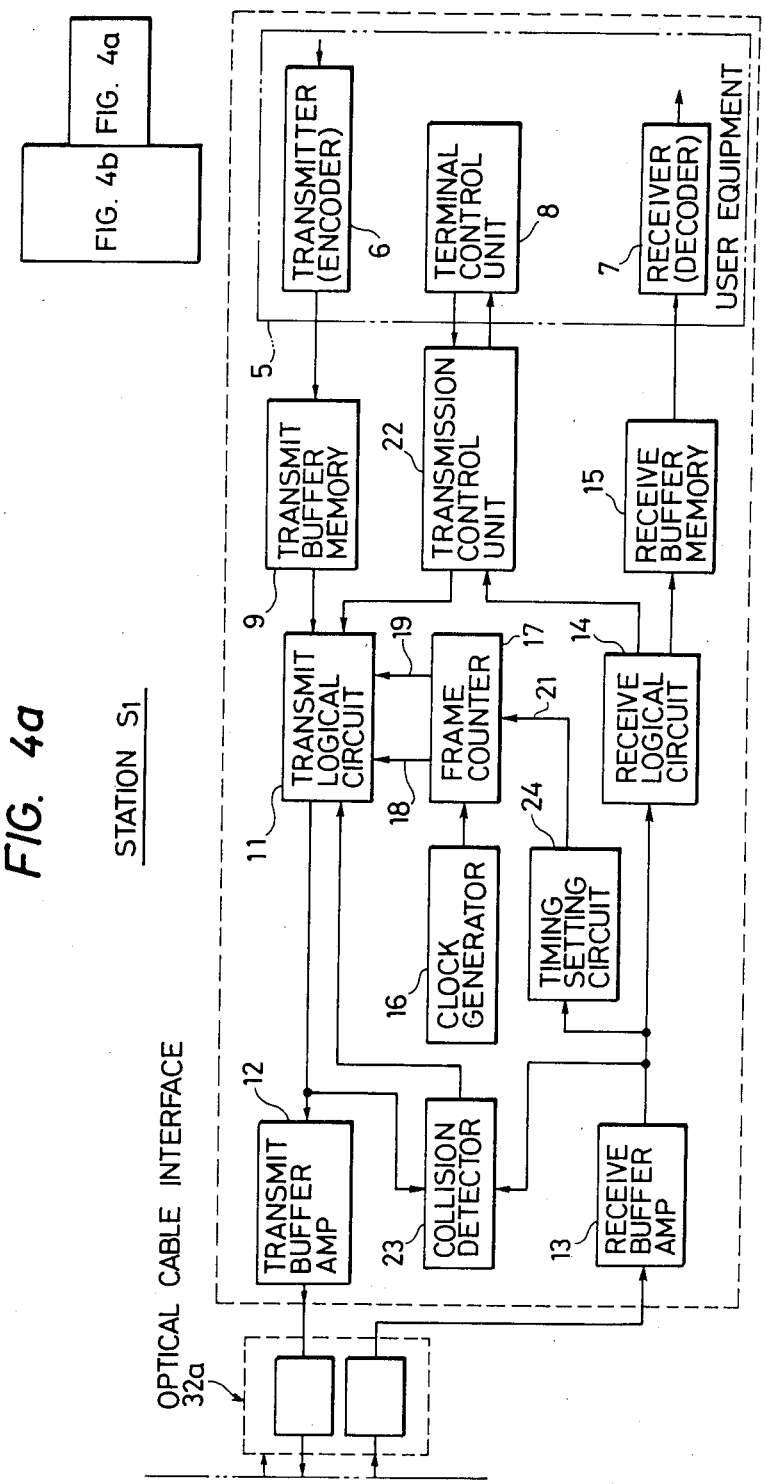

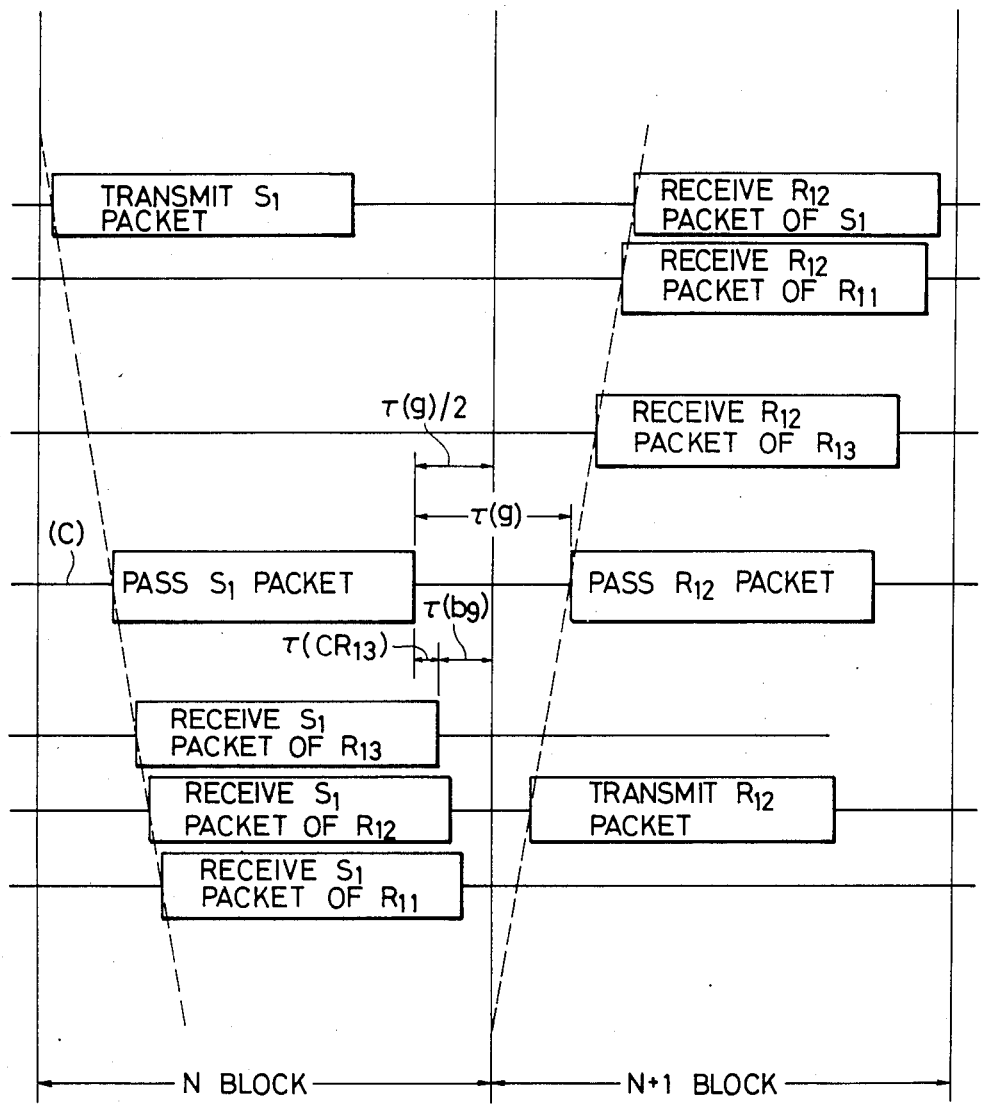

METHOD AND DEVICE FOR SYNCHRONIZATION OF SYSTEM TIMING

BACKGROUND OF THE INVENTION

1. Field of the Invention

In the communication system for time-sharing multiplex transmission of digital signals by the use of optical cables, this invention relates to a method for the synchronization of system timing required in the apportionment of time among packets of signals transmitted from the personal stations of the system in the optical cables and to a device for working this method.

2. Description of the Prior Art

In recent years, the development of a local area network (LAN) for transporting signals in the form of packets by the use of routes formed by laying coaxial cables in the form of buses has culminated.

This LAN which makes use of packets requires installation, as in laboratories, of transmission cables adapted to effect transmission in both directions and connection to these transmission cables of numerous personal stations. From these personal stations, messages divided into data blocks each of 1000 to 2000 bits, for example, are transmitted through the transmission cables. The individual messages are each prefixed with a header covering such information as address and serial number.

In the LAN of this nature, the network itself is a passive transmission medium totally devoid of any control function and the individual personal stations have such control functions thoroughly distributed among themselves.

At a given personal station, therefore, transmission of a message is started when an idle channel is available in the cables. When a packet of message transmitted from one personal station collides with a packet of message transmitted from another personal station, these two personal stations discontinue the transmission of their messages. The personal station which has discontinued the transmission, on elapse of a random queuing time, tries to resume the transmission of the message. This system is called "Carrier-Sense Multiple Access/Collision-Detection(CSMA/CD)"

Incidentally in this LAN, since individual personal stations have liberty of starting data transmission at any time desired, there is a possibility of packets colliding with each other on the transmission line. The LAN, therefore, entails a problem that it has no fixed transmission delay time. Because of this problem, it does not perfectly fit the real-time transmission such as for the conversation type vocal communication in which real-time transmission and reception are highly valued.

The problem is solved by keeping a master station in operation permanently and enabling the individual personal stations to reserve right to channel access with the master station. In this setup, however, a failure in the master station could result in total inactivation of data communication. This possibility impairs the reliability of this system.

For the solution of the problem just mentioned, there has been proposed the modified Ethernet system which is capable of providing real-time transmission without depriving the personal stations of their mutual equality.

In accordance with this signal transmission system, the frames which are periodically repeated along time axis are each divided into a plurality of blocks along the time axis. With these blocks as the unit, this system provides the personal stations with chances for packet type communication.

In this signal transmission system, all the personal stations are equally entitled to the use of idle blocks. In case where a given personal station occupies a specific block over a duration necessary for signal transmission, that personal station is periodically given a chance for signal transmission in each of frames repeated on the time base. Thus, this system permits the personal stations to effect real-time transmission of signals by making use of the function described above.

One typical frame configuration for the signals to be used in the aforementioned digital signal transmission system is illustrated in FIG. 1.

Each of the frames which are repeated periodically on the time base consists of N blocks (#1 through #N). And each of the blocks consists of various bit rows, $b_1$ through $b_9$, as shown below.

$b_1$ . . . Rear guard time
$b_2$ . . . Preamble
$b_3$ . . . Address field
$b_4$ . . . Distance code field
$b_5$ . . . Control field
$b_6$ . . . Data field
$b_7$ . . . Frame check sequence (FCS) field
$b_8$ . . . End flag
$b_9$ Front guard time The bit rows $b_2$ through $b_5$ and the bit rows $b_7$ and $b_8$ are essential components for a packet. These bit rows are collectively referred to as "overhead bits." The two bit rows, $b_1$ and $b_9$, are collectively referred to as the "guard time."

The term "guard time" means "empty bit rows" which are intended to preclude the situation in which packets in adjacent blocks may possibly be caused to overlap, if partially, owing to the delay time which occurs during the propagation of signals on a coaxial cable.

In the bit rows forming this guard time, the backward guard time $b_1$ serves to protect the trailing one of any two adjacent packets against the trouble of overlapping and the forward guard time $b_9$ similarly to protect the leading packet against the trouble.

The sum of the number of bits of the rear guard time $b_1$, and that of bits of the front guard time $b_9$, will be represented as g bits and the guard time $(b_1 + b_9)$ will be represented hereinafter as $\tau(g)$.

In the digital signal transmission system proposed as described above, when none of the personal stations in the system is transmitting signal, all the personal stations have a chance, equally and at any time at all, to start sending out signals in the aforementioned frame configuration. Thus, the particular personal station which is the first to start sending out signal onto the transmission cable will take the initiative in the synchronization of frames.

Once the frame synchronization has been established as described above, all the personal stations are enabled to keep watch on the state of signals being transmitted on the transmission cable.

As will be described fully afterward, the user devices at the personal stations are each provided with a memory adapted to memorize the condition of occupation of individual blocks by signals in the frames. Thus, all the personal stations are allowed to register relevant blocks based on the incoming packet signals addressed to themselves.

After the particular personal station has established the frame synchronization, any of the other personal stations is allowed to send out packet signals by selecting empty blocks based on the information stored in the aforementioned memory and loading these empty blocks with packet signals desired to be transmitted.

In this case, the timing by which the personal stations are allowed to send out their own packet signals poses a problem.

For the sake of explanation, let us assume that, as illustrated in FIG. 2, a coaxial cable 3 has its opposite ends connected to impedance matching terminators 1 and 2, a personal station C is located at the middle point of the coaxial cable 3, and a personal station S located between the personal station C and the terminator 1 is already in the process of transmitting signals on the coaxial cable 3.

In this case, the packet signals which are being sent out by the personal station S are received by the personal station C and the other personal stations, $R_1$ through $R_4$, on the coaxial cable 3 at different points of time, depending on the variation in the signal propagation delay time on the cable 3.

If the personal stations randomly send out their own signals without paying any respect to the other personal stations, then there is a fair possibility that the packets issuing from such personal stations will overlap (collide with) each other on the coaxial cable 3.

For the purpose of precluding this detestable phenomenon, the aforementioned signal transmission system makes effective use of the aforementioned concept of guard time $\tau(g)$, in establishing the synchronization of system timing.

To be more specific, in this signal transmission system, the guard time $\tau(g)$, is fixed at two or more times of the signal propagation delay time required to cover the distance between the centrally located personal station C, datum position, and the most distant personal station and the transmission of signals is effected so that, at the receiving point of the centrally located personal station C, the packets issuing from the individual personal stations will be arranged as separated by equal intervals.

FIG. 3 provides more specific illustration of the working of the signal transmission system. The diagram depicts the system on the assumption that while the personal stations of the system are connected as illustrated in FIG. 2, the personal station S is already in the process of transmitting signals and the other personal stations, $R_1$ through $R_4$, are about to start sending out packet signals.

In this case, the personal stations $R_1$ through $R_4$ which follow the personal station S in the order of signal transmission determine their own points of timing for sending out their own transmission packets so that the personal station C, the datum points, will begin to receive the transmitted packets one guard time $\tau(g)$, after the personal station C completes reception of the transmission packets (or transmission S packets) from the personal station S.

To determine such timing for the issuance of signals, the personal stations $R_1$ through $R_4$, on receiving the packet signals transmitted on the coaxial cable 3, first examine the address field ($b_3$) of the received packet signals and discern the reception of packets from the personal station S (reception S packets).

Further, the personal stations $R_1$ through $R_4$, based on the signal propagation delay times between the personal station S, the centrally located personal station C, and their own stations, determine the points of time at which the arrival of reception S packets at the point of reception of the personal station C is completed.

These points of time, as illustrated in FIG. 3, are later than the points of time at which the reception of the reception S packets at the personal stations $R_1$ and $R_2$ is completed and earlier than the point of time at which the reception of the reception S packets at the personal stations $R_3$ and $R_4$ is completed.

After the personal stations $R_1$ through $R_4$ have determined the point of time at which the reception of reception S packets is completed with reference to the personal station C as the datum point, the particular one of these four personal stations which desired to send out signals begins to send out packet signals [or transmission $R_i$ packets (i=1 to 4)] at the point of time which is earlier than the determined point of time mentioned above by an interval equivalent to the signal propagation delay time required to cover the distance between its own station and the personal station C.

The packet signals which have been sent out as described above begin to be received (as reception $R_i$ packets) at the personal station C as the datum point after elapse of one guard time $\tau(g)$, from the time of completion of the reception of reception S packets as illustrated in FIG. 3.

This adjustment of the timing for sending out signals is accomplished by establishing frame synchronization and block synchronization at all the personal stations concerned.

Specifically, the personal stations are adapted, as described fully afterward, to reset periodically at a fixed timing the frame counter and the block counter which take count of the clock signals fed out by their own oscillators. Because of this function, the personal stations are able to establish system timing of frame synchronization and block synchronization, etc. within the tolerance of frequency of the clock signals.

At the personal station $R_3$ located on the outer side of the personal station C as viewed from the personal station S, for example, the aforementioned frame counter and block counter are reset on elapse of the time, $\tau(b_9)$, calculated by the following formula (hereinafter referred to as "front guard time"):

$$\tau(b_9) = \tau(g)/2 - \tau(CR_3) \tag{1}$$

from the time of the rear end of the reception S packets, and these counters are controlled so as to start the second block, #2, at that time. In the formula, $\tau(CR_3)$ denotes the time for propagation of signals between the personal station C and the personal station $R_3$.

At the personal station $R_2$ which is located between the personal station S and the personal station C, the front guard time, $\tau(b_9)$, is found as follows:

$$\tau(b_9) = \tau(g)/2 + \tau(CR_2) \tag{2}$$

In this formula, $\tau(CR_2)$, denotes the time for propagation of signals between the personal station C and the personal station $R_2$.

Then at the personal station $R_1$ which is located on the outer side of the personal station S as viewed from the personal station C, the front guard time, $\tau(b_9)$, is found as follows.

$$\tau(b_9) = \tau(g)/2 + \tau(SC) - \tau(SR_1) \tag{3}$$

In the formula, $\tau(SC)$ denotes the time for propagation of signals between the personal station S and the personal station C and $\tau(SR_1)$ the time similarly between the personal station S and the personal station $R_1$.

The personal stations $R_1$ through $R_4$ start transmitting packets of signals on elapse of the respective intervals, $t_1$ through $t_4$, which are determined by the following formulas, from the time of reset of said counters:

$$\left.\begin{array}{l} t_1 = \tau(g)/2 - \left(\begin{array}{l}\text{time for propagation of signals}\\ \text{between the stations } C \text{ and } R_1\end{array}\right) \\ t_2 = \tau(g)/2 - \left(\begin{array}{l}\text{time for propagation of signals}\\ \text{between the stations } C \text{ and } R_2\end{array}\right) \\ t_3 = \tau(g)/2 - \left(\begin{array}{l}\text{time for propagation of signals}\\ \text{between the stations } C \text{ and } R_3\end{array}\right) \\ t_4 = \tau(g)/2 - \left(\begin{array}{l}\text{time for propagation of signals}\\ \text{between the stations } C \text{ and } R_4\end{array}\right) \end{array}\right\} \quad (4)$$

In other words, the rear guard times, $\tau(b_1)$, for the signals transmitted from the personal stations $R_1$ through $R_4$ equal the intervals indicated by the foregoing formula (4).

In the LAN, the code distance indicative of the position of the particular station that holds the priority (or leadership) in frame synchronization is placed, as illustrated in the packet construction of FIG. 1, in the distance code field ($b_4$) of the master packet issuing from that (master) station. In the distance code field ($b_4$) in the packet issuing from any personal station other than the master station, a specific code different from the distance code assigned to that personal station is placed. This code is intended to designate that the station is not a master station.

Each of the stations other than the master station keeps watch on the distance code field ($b_4$) in every packet it receives. When it detects the distance code field ($b_4$) indicative of the distance code (the distance code field of the master packet), the distance code field ($b_4$) is transfered to the receive logical circuit.

The receive logical circuit incorporates an arithmetic circuit, which determines the front guard time, $\tau(b_9)$, in accordance with the pertinent one of the aforementioned three formulas (1) through (3), using the distance code of the master packet so transferred and the distance code of the particular personal station that has received the distance code. The signal resulting from this arithmetic operation is fed to a programmable timer, for example, and the timer is operated from the rear end of the master packet. By resetting the aforementioned counters with the output of this timer, therefore, the frame synchronism and the block synchronism of the station can be established.

By the term "programmable timer" as used herein is meant a general-purpose circuit so adapted that, when started by the supply of a signal corresponding to the front guard time, $\tau(b_9)$, designates with a rise or fall of signal the time which arrives after elapse of the front guard time, $\tau(b_9)$, from the time the timer is started.

Unfortunately, the LAN constructed as described above entails the following drawbacks.

(1) Since this system uses coaxial cables, it is susceptible of the adverse effects such as of the electromagnetic induction noise. Thus, the system is not suitable for installation within a plant which is using large electric power.

(2) The highest possible rate of signal transmission obtained by the coaxial cables is only about 50 Mbps. Thus, the system is not suitable for data transmission which is required to be effected at a higher rate.

(3) The system necessitates arithmetic operations to be performed on the pertinent one of the three formulas (1) through (3) as applied to the positional relations of the master station and the individual personal stations. For the purpose of such arithmetic operations, the system requires a complicated circuit.

SUMMARY OF THE INVENTION

As object of this invention is to provide a system which entails none of the aforementioned drawbacks suffered by the conventional system, permits system timing to be established with a simple circuit, and enables data transmission to be effected at a high rate without suffering the adverse effects such as electromagnetic induction noise, for example.

In the multistation communication network for effecting time-sharing multiplex transmission and reception of digital signals in the form of packets by the use of optical cables, this invention is characterized by enabling system timing to be established by having a flag for identifying a signal from a master station put on only on the packet signal issued from the station which has acquired priority in system timing, determining the front guard time of the individual personal stations by arithmetic operations using the distances between an optical star coupler placed at the center of the communication network and the individual personal stations and the guard time at the position of the optical star coupler, counting the aforementioned front guard time starting from the trailing ends of the packet signals of the master station received by the individual personal stations, and using as the reference points the respective times at which the counting is completed.

BRIEF DESCRIPTION OF THE DRAWINGS

FIG. 5 is a timing diagram illustrating an envelope of signal waveforms of transmission and reception packets at the personal stations adopted in the system structure illustrated in FIG. 4.

DETAILED DESCRIPTION OF THE INVENTION

Now the present invention will be described in detail below with reference to an embodiment.

Figure 4B:
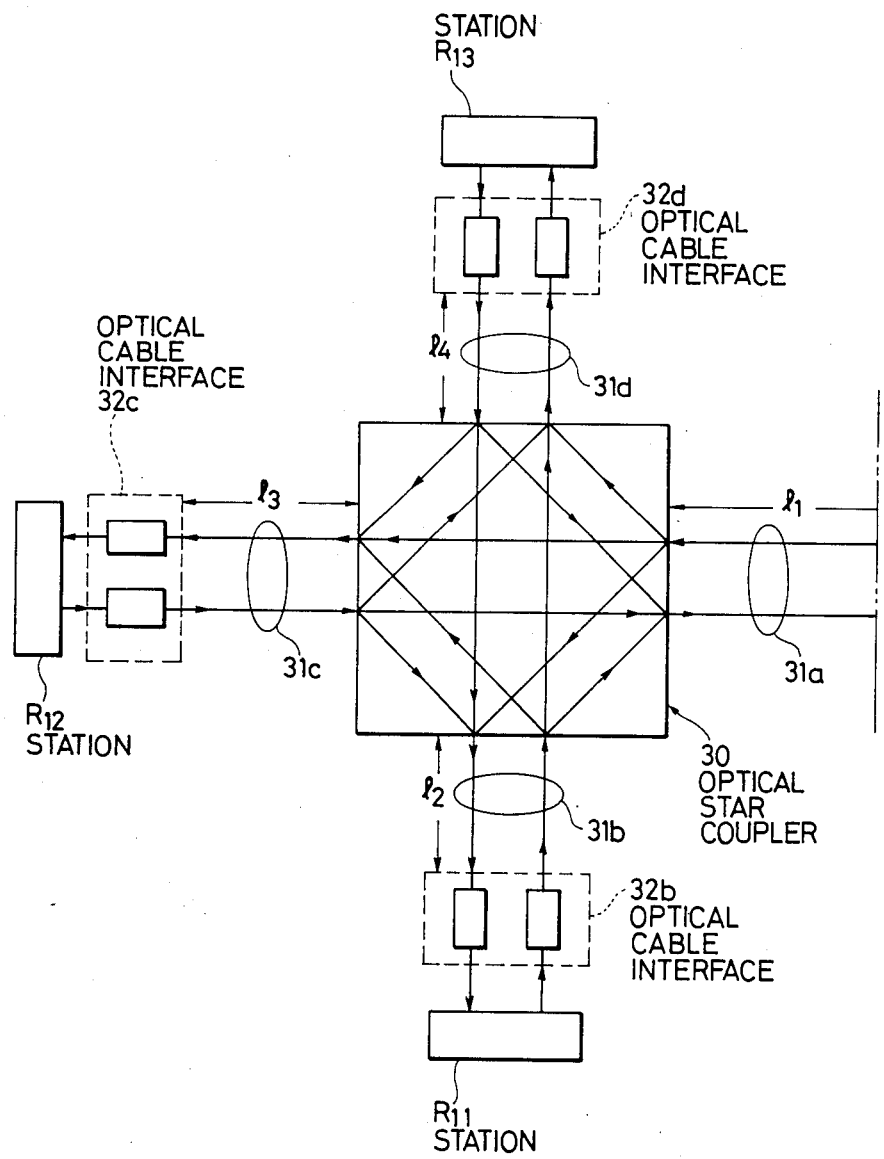
FIG. 4 (FIGS. 4a and 4b) is a diagram illustrating in outline a communication system in one embodiment of this invention.

FIG. 4 is a diagram illustrating in outline a LAN for realizing a method for the synchronization of system timing as one embodiment of this invention. In the present embodiment, an optical star coupler is depicted as adapted for serving four stations. This invention does not discriminate the optical star coupler by the number of stations to be served thereby.

In the LAN of the present embodiment, an optical star coupler 30 is located at the middle of a network. At the ends of the transmission routes 31a, 31b, 31c, and 31d formed of paired optical cables extended in outer directions from the optical star coupler 30, stations $S_1$, $R_{11}$, $R_{12}$, and $R_{13}$ are disposed respectively through the medium of optical cable interfaces 32a, 32b, 32c, and 32d each formed of an electricity-light converter and a light-electricity converter. Since all these stations have a basically equal construction, only the essential part of the station $S_1$ connected to the optical cable interface 32a is illustrated in detail in the diagram. The embodiment cited herein below, therefore, will be described mainly with reference to the station $S_1$.

Each of the personal stations is provided with a user equipment 5 incorporating a computer and a telephone. The user equipment 5 is further provided with a transmitter (encoder) 6 for transmitting digital signals of the unit of packets to some other personal station, a receiver (decoder) 7 for receiving digital signals of the unit of packets transmitted by some other personal station, and a terminal control unit 8 for controlling terminals.

The signals issued from the transmitter 6 are temporarily stored in a transmission buffer memory 9. The stored outgoing signals are then read out of the buffer memory 9 at a prescribed time by clock signals equalling the transmission speed on the optical fiber cable 31a serving as a transmission medium. The signals thus read out are converted into packets of a prescribed pattern by a transmit logical circuit 11. These packets are sent through a transmit buffer amplifier 12 and forwarded via the optical cable interface 32a onto the optical fiber cable 31a.

All the packet signals which are being transmitted on the optical fiber cable 31a are sent through the optical star coupler 30, received by a reception buffer amplifier 13, and supplied to a receive logical circuit 14.

The receive logical circuit 14 selects, out of all the incoming packets, only the packets addressed to its own personal station and puts the selected packets to temporary storage in a receive buffer memory 15. The packet signals thus kept in storage are read out continuously by the use of a prescribed clock in the receiver 7. Thus are obtained received output signals.

The transmission and reception of signals are accomplished as described above. The transmission clock which is used in this case is generated by a transmit clock oscillator 16. A frame counter 17 serves to divide this transmit clock to produce a block timing signal 19 and a frame timing signal 18.

A timing setting circuit 24 serves to synchronize system timing by producing a reset signal 21 from a packet signal issued from a station for establishing system timing and forwarding the reset signal 21 so produced to a frame counter 17. This function of the timing setting circuit 24 will be described in further detail afterward.

A transmission control unit 22 effects control of the terminal control unit 8 in accordance with reception signals addressed to its own personal station and derived from the receive logical circuit 14 and, at the same time, controls the transmit logical circuit 11 in accordance with instructions from the terminal control unit 8.

A collision detector 23 serves, at the time that the first packet signal is issued on the block selected by its own personal station, to check and confirm whether or not that packet signal has collided with a packet signal issued from some other personal station.

FIG. 5 illustrates the timing relation among the transmission and reception packet signals at the personal stations adopted in the system construction described above.

The diagram of FIG. 5 is drawn on the assumption that the lengths $l_1$, $l_2$, $l_3$, and $l_4$ of the optical cables 31a, 31b, 31c, and 31d connected respective to the stations $S_1$, $R_{11}$, $R_{12}$, and $R_{13}$ have the following relations.

$$l_1 > l_2 > l_3 > l_4$$

In the present embodiment, each personal station issues packet signals on such timing that, at the position (C) of the optical star coupler, the packet signals always pass the center of the block as illustrated in FIG. 5. Further in the system of this embodiment, as noted clearly from the system structure diagram of FIG. 4, communication between any given pair of transmitting and receiving stations takes place through the medium of the optical star coupler 30 without exception.

The arithmetic operation required in establishing system timing for each personal station, therefore, is limited to that which is based on the aforementioned formula (1). The front guard time, $\tau(b_9)$, of the personal station $R_{13}$, for example, is expressed by the following formula.

$$\tau(b_9) = \tau(g)/2 - \tau(CR_{13}) \qquad (5)$$

In this formula, $\tau(CR_{13})$ denotes the time for propagation of signals between the optical star coupler and the personal station $R_{13}$.

As is plain from the formula (5), the formula used in the present embodiment for determination of the front guard time, $\tau(b_9)$, does not contain any such term regarding the distance from the station issuing the master packet as found in the aforementioned formula (3). Thus, the present embodiment has no use for the distance code field ($b_4$) within the frame of packet signals illustrated in FIG. 1. Instead, it is required to include within the control field ($b_5$) a region used exclusively for putting up a flag serving to identify a master packet.

In the method for the synchronization of system timing in the present embodiment, the personal stations have alloted thereto the distance codes indicating the respective distances from the optical star coupler to the personal stations. These distance codes are correlated exclusively with the times for propagation of signals in the optical cable.

Figure 6:
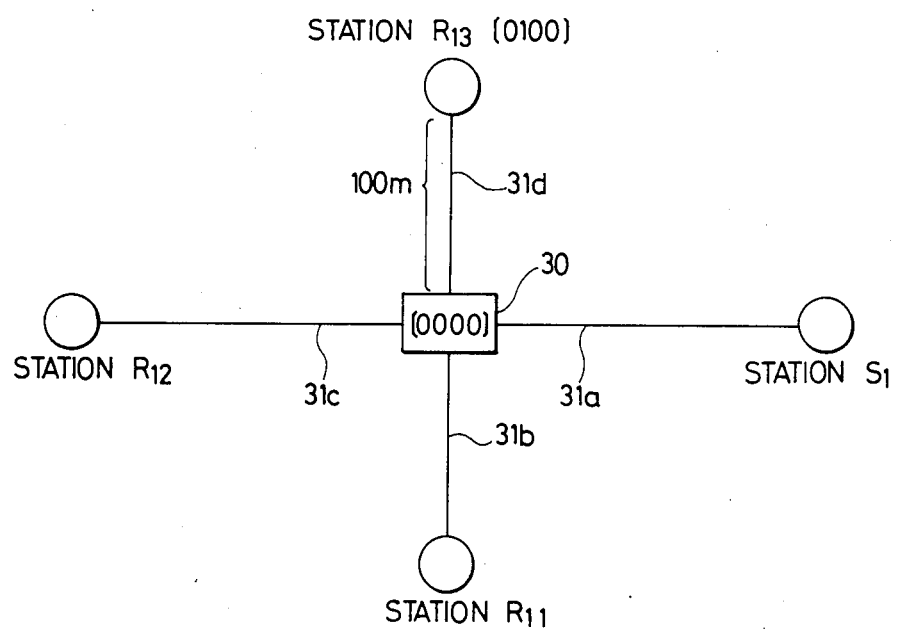
FIG. 6 is an explanatory diagram illustrating the relation between the relevant points on the communication system and the distance codes in the embodiment of this invention.

In the present embodiment, as illustrated in FIG. 6, the optical star coupler 30 which is located at the middle of the system is used as the datum point for all the distance codes and is represented by the four-digit distance code [0000]. Then, the distance codes of the individual personal stations are determined based on the lengths of the optical cable from the optical star coupler to the respective personal stations. As the unit of these distance codes, the time which the digital signals transmitted in the optical cables 31a through 31d take in covering a distance equalling the interval between the adjacent bits of the signals can be conveniently adopted.

It is assumed that the station $R_{13}$ is located at a distance of 100 meters from the optical star coupler. It is further assumed that the delay time in the propagation of signals in the optical cables 31a through 31d is 4 nS (nanoseconds) per meter and the rate of propagation of digital signals is 10 Mbps (mega-bits per second). In this case, the delay time in the propagation of signals over the distance of 100 meters is 400 nS, which equals the interval of four bits of digital signals. The distance to the personal station $R_{13}$, therefore, can be expressed as a numerical value "0100" which represents the decimal numerical value "4" by the binary denotation.

By using the distance code under discussion, the term $\tau(CR_{13})$ in the aforementioned formula (5) can be easily determined by the following formula.

$$\tau(CR_{13}) = \text{Distance code} \times \frac{1}{\text{Rate of transmission}}$$

In this manner, to the individual personal stations connected to the optical cables 31a through 31d, the respective distance codes are allocated. The personal stations have their own distance codes deposited in a station distance code setter 242 shown in FIG. 7. As the station distance code setter, a switch device for setting binary numerals such as, for example, a dual-in-package switch can be used.

Now, the manner in which sychronization of system timing is actually effected in the LAN of the present embodiment constructed as described above will be described with reference to FIG. 4.

Each personal station is enabled to determine whether or not any station is engaging in transmission of signals at a given moment by checking the existing contents of a memory (not shown) provided within the pertinent user's equipment 5. When it is confirmed that none of the stations is engaging in transmission of packet signals, the personal station issues new packet signals. If this transmission of new packet signals is successful, then the particular station acquires priority in system timing. The station which thus acquires priority in system timing is called here a "master station".

All the personal stations in the system are equally entitled to acquisition of the status of "master station". It does not necessarily follow, however, that any personal station which leads other stations in starting transmission of packet signals turns into a master station at all times. This situation has already been explained as a problem of collision between packet signals.

Figure 1:
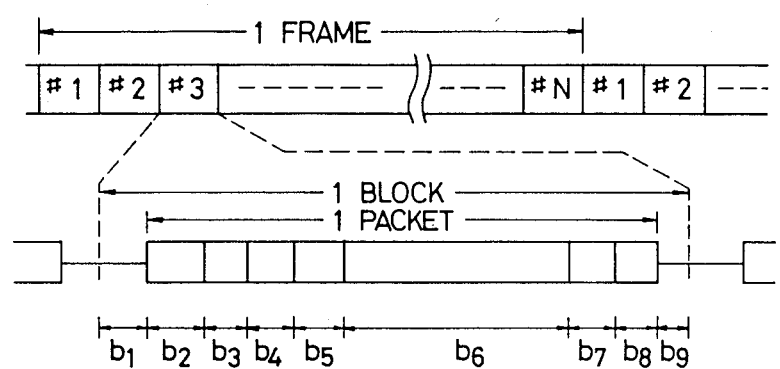
FIG. 1 is a schematic diagram of a typical signal structure illustrating a frame to be cyclically repeated along the course of time, a block which repeats itself to form the aforementioned frame, and a plurality of signals which make up the aforementioned block.
Figure 2:
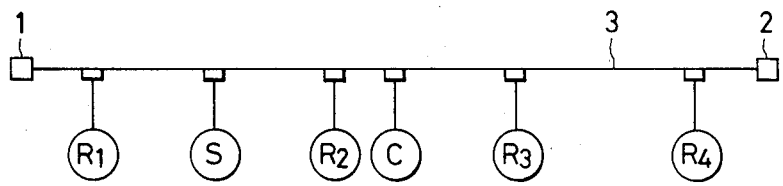
FIG. 2 is an explanatory diagram illustrating the condition in which personal stations are disposed along a coaxial cable in accordance with the conventional technique.
Figure 3:
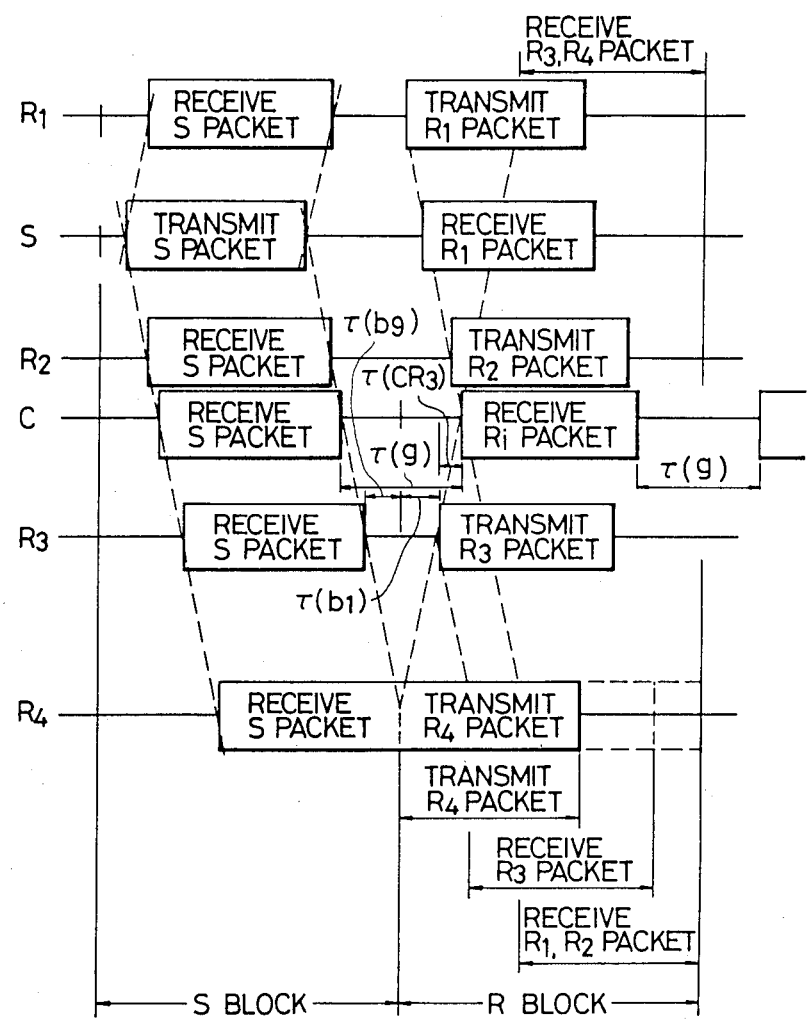
FIG. 3 is a timing diagram illustrating an envelope of signal waveforms of transmission and reception packets at the receiving taps of the personal stations illustrated in FIG. 2.

The personal station which is the first to issue packet signals set up the master flag in the control field (b5) as described in FIG. 1. This action can be effected within the transmit logical circuit 11, for example. The packet signals produced in the transmit logical circuit 11 are sent out into the optical cables 31a through 31d and delivered to the personal stations. When this first issuance of packet signals is successful, the particular personal station which has made this successful issuance assumes the status of a master station.

While the master station is present, the packet signals issed by the master station (hereinafter referred to as "master packets") serve as the basis of synchronization of frames. Each personal station, for the purpose of discriminating between the master packet and the other packet signals, keeps in the reset state the master flag in the control field (b5) in all the packet signals other than the master packet.

Each personal station other than the master station keeps watch on the control field (b5) in the packet signals to be received from all the stations to find whether the master flag is present or not therein. On detection of the control field (b5) having the master flag set up therein, the personal station transfers this master flag to the timing setting circuit 24 and starts the timing setting circuit 24 operating.

Figure 7:
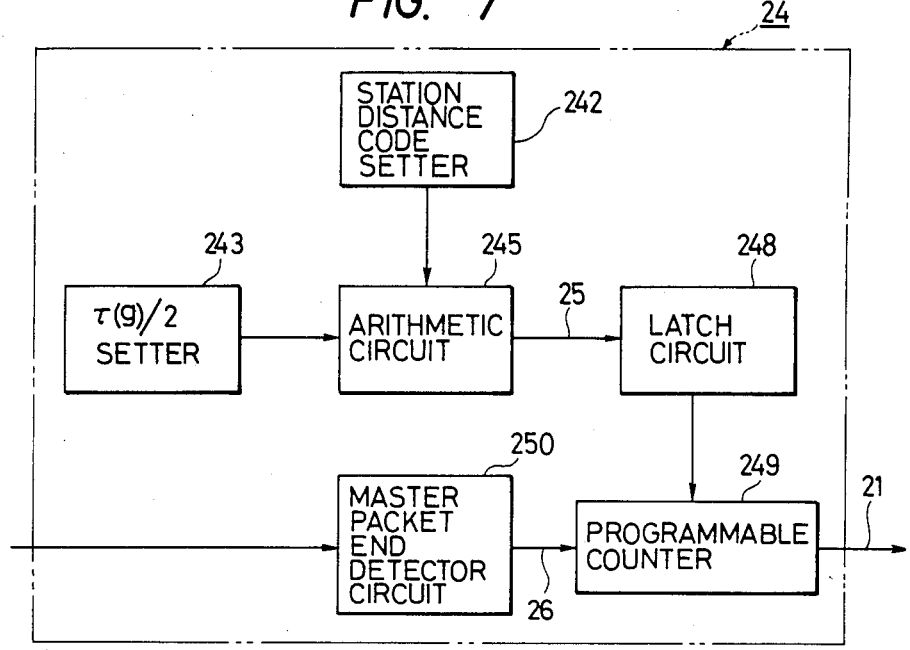
FIG. 7 and FIG. 8 are block diagrams illustrating first and second concrete timing setting circuits for embodying the communication system of FIG. 4.

FIG. 7 illustrates a typical example of the timing setting circuit 24. The distance code of the own station to be supplied by the station distance code setter 242 and one half of the guard time $\tau(g)$ of packet signals at the position of the optical star coupler 30 to be supplied by a $\tau(g)/2$ setter 243 are led to an arithmetic circuit 245 for performing the calculation of the formula (5). This arithmetic circuit 245 calculates the front guard time, $\tau(b_9)$ (or queing time) of the own station and feeds out the result to the calculation as a signal 25. This signal 25 is supplied to a latch circuit 248.

The latch circuit 248 retains the output signal 25 of the arithmetic circuit which corresponds to the front guard time, $\tau(b_9)$, (or queing time) and then feeds it to a programmable counter 249. As its trigger, this programmable counter 249 uses an output signal 26 from a master packet end detector circuit 250 which functions to detect the trailing end of the master packet. The programmable counter 249, triggered by the output signal 26, starts clocking the front guard time, $\tau(b_9)$, from the time the reception of the master packet is completed and, after passage of the time, generates a reset signal 21. The reset signal 21 is supplied to a frame counter 17 shown in FIG. 4 and resets this counter. As the result, the system timing is synchronized.

Figure 8:
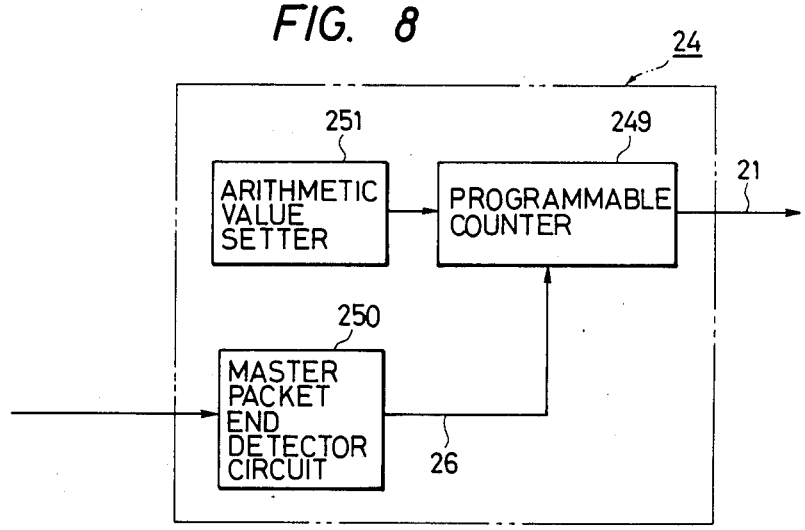

FIG. 8 illustrates a second typical example of the aforementioned timing setting circuit 24. In this diagram, the components which find identical or equal counterparts in FIG. 7 are denoted by like symbols. The description of these components is properly omitted.

The present embodiment is provided with an arithmetic value setter 251. This arithmetic value setter 251 is composed of components such as a dual-in-package switch and is adapted to set the front guard time, $\tau(b_9)$ of the own station. At the time that a given personal station is installed, the worker engaging in the installation is expected to determine in advance the front guard time, $\tau(b_9)$, of that particular station in accordance with the formula (5) and set the guard time, $\tau(b_9)$, in the arithmetic value setter 251 during the course of the installation. The value so set in the arithmetic value setter 251 is supplied to the programmable counter 249. When the output 26 from the master packet end detection circuit 250 is applied, the programmable counter 249 starts clocking the front guard time, $\tau(b_9)$ and, on elapse of this time, issues the reset signal 21.

For the purpose of transfer of the status of "master station," the method of effecting transfer of the status of "mastership" from the existing master station to some other personal station through a fixed procedure when the former has run out of the information to be transmitted and the latter happens to be engaging in transmission at that time or the method of enabling the personal station which has assumed the status of "mastership" to continue the issuance of master packets even after exhaustion of the information to be transmitted and allowing this master station to yield the status of "mastership" to some other personal station only when the existing master station encounters any mechanical failure may be suitably adopted. Since this particular operation has no bearing on the present invention, any further description of this operation is omitted.

As described above, the method for the synchronization of system timing as contemplated by the present invention determines the timing for resetting the frame counter exclusively based on the formula (5) instead of suitably selecting a pertinent formula out of the three formulas (1) through (3) and determining the front guard time as involved in the conventional device. Since this method permits the synchronization of system timing to be effected on the basis of the data on the distances from the optical star coupler located at the middle of the communication system to the individual personal stations, the arithmetic element used for the arithmetic operations needed for synchronizing of each personal station is simple in structure.

Since the system effects transmission and reception by the optical communication network using optical cables, it is insusceptible to the adverse effects such as of electromagnetic inductance and is effective in performing data transmission at a high rate.

What is claimed is:

1. In a multistation communication network for effecting time-sharing multiplex transmission and reception of digital signals in a form of packets by use of optical cables, a method for synchronization of system timing, which comprises putting up a flag identifying a signal from a master station only in a packet signal issued from a personal station which has acquired priority in system timing, determining front guard time for packet signals of individual personal stations by an arithmetic processing using distances from an optical star coupler located at a middle of said communication network to said individual personal stations and a predetermined guard time representative of the guard time needed for a signal originating at the position of said optical star coupler, clocking said front guard time starting from trailing ends of the packet signals of said master station received by said individual personal stations, and establishing system timing based on times at which said clocking is completed.

2. A method according to claim 1, wherein said distances between said optical star coupler and said individual personal stations are expressed by distance codes.

3. A method according to claim 2, wherein said distance codes are defined by using as a unit therefore the time which the digital signals transmitted in said optical cables take in covering a length equalling an interval between bits of said digital signals.

4. A method according to claim 1, wherein said front guard time, t, is determined by the following formula, $$t = \tau(g)/2 - \tau(CR)$$

wherein $\tau(CR)$ denotes a time for propagation of signals between said optical star coupler and a personal station other than said master station and $\tau(g)$ the guard time at the position of said optical star coupler.

5. In a multistation communication network for effecting time-sharing multiplex transmission and reception of digital signals in the form of packets by use of optical cables, a device for synchronization of system timing, which comprises an optical star coupler disposed at a middle of a communication system at which said optical cables are concentrated, means for retaining front guard times determined based on lengths of said optical cables from said optical star coupler to said individual personal stations and a guard time at the position of said optical star coupler, means for attaching a mark identifying a packet signal from a master station to a packet signal issued from a master station holding priority in system timing, means for recognizing reception of said packet signal from said master station by virtue of said mark, and means for clocking said front guard time based on said packet signal from said master station, means for taking the synchronization of system timing by using an output signal from said means for clocking, and wherein all the means described above except for said optical star coupler are furnished for each of said individual personal stations.

6. A device according to claim 5, wherein said individual personal stations are each provided with means for retaining in advance a distance code obtained by encoding the length of an optical cable from said optical star coupler to the personal station, means for retaining in advance the guard time at the position of said optical star coupler, and means for determining said front guard time based on said distance code and said guard time.

7. A device according to claim 5, wherein said means for clocking is adapted to count said front guard time starting from a trailing end of the packet signal from said master station.

* * * * *